United States Patent [19]
Halischuk

[11] Patent Number: 5,873,417
[45] Date of Patent: Feb. 23, 1999

[54] CULTIVATOR ATTACHMENT FOR A SKID STEER TRACTOR UNIT

[76] Inventor: Cory Halischuk, Box 252, Manituba, Canada, R0C 0P0

[21] Appl. No.: 927,929

[22] Filed: Sep. 11, 1997

Related U.S. Application Data

[60] Provisional application No. 60/027,093 Sep. 25, 1996.

[51] Int. Cl.⁶ .................................................. A01B 35/18
[52] U.S. Cl. ...................... 172/246; 172/199; 172/568; 172/40
[58] Field of Search ..................................... 172/246, 566, 172/567, 568, 569, 40, 199; 37/403, 142.5; 414/685, 723; 180/6.48, 24.12, 24.02, 273

[56] References Cited

U.S. PATENT DOCUMENTS

| | | | |
|---|---|---|---|
| 3,106,255 | 10/1963 | Kenney | 172/568 |
| 3,620,310 | 11/1971 | Richey | 172/600 |
| 4,892,155 | 1/1990 | Wanamaker | 172/199 |
| 4,903,418 | 2/1990 | Loudon | 37/403 X |
| 5,171,124 | 12/1992 | Foster | 414/685 |
| 5,458,203 | 10/1995 | Evers | 172/569 |
| 5,526,590 | 6/1996 | Palm et al. | 172/40 X |

*Primary Examiner*—Thomas B. Will
*Assistant Examiner*—Robert Pezzuto
*Attorney, Agent, or Firm*—Adrian D. Battison; Murray E. Thrift

[57] ABSTRACT

A cultivator attachment is mounted on a skid steer tractor and includes a main frame, a vertical receptacle attached to the frame to receive and attach to the mounting plate member of the skid steer tractor and a plurality of cultivator discs carried on the frame for working ground underneath the frame and forwardly of the skid steer tractor unit. Two rows of disk extend across the frame generally transverse to the forward direction. One of the rows of discs includes teeth projecting outwardly from at least some of the discs. Each row includes two disc sections arranged such that an axis of rotation of the discs is inclined to the forward direction and converge to an apex centrally of the frame. The disc sections are adjustable from a first position in which the apexes of the rows are adjacent to a second position in which the apexes are spaced apart so as to reverse the direction of cut of the discs and allow movement of the frame in a reverse direction opposite to the forward direction. An actuating cylinder mounted on the frame effects simultaneous adjustment of the two rows of discs.

3 Claims, 3 Drawing Sheets

CULTIVATOR ATTACHMENT FOR A SKID STEER TRACTOR UNIT

This application is a continuation of Provisional Application Ser. No. 60/027,093, filed Sep. 25, 1996.

This invention relates to a cultivator attachment which can be mounted on a conventional skid-steer tractor.

BACKGROUND OF THE INVENTION

Skid steer tractor units are well known and widely used and comprise a frame, two ground wheel arrangements each mounted on a respective side of the frame either in the form of wheels or tracks, pair of forwardly extending front arms mounted on the frame for pivotal movement upwardly and downwardly, a mounting plate member at a forward end of the arms and pivotal relative thereto and an actuating cylinder for effecting pivotal movement of the mounting plate member. Generally the tractor unit carries a loader bucket on the forwardly extending front arms. However the loader bucket can be replaced by various accessories which allow the skid steer loader to be used for other purposes.

Accessories are presently available for effecting a cultivation action on ground forwardly of the skid steer unit. These devices are used in construction for rough landscaping of the ground around the construction. The cultivator attachment or accessory generally use a driven rotor tiller type action so that the equipment is relatively complicated and requires power to the various moving parts.

SUMMARY OF THE INVENTION

It is one object of the present invention, therefore, to provide an improved cultivator attachment for mounting on a skid steer unit of the above type.

According to one aspect of the invention there is provided a cultivator attachment for mounting on a skid steer tractor unit, the tractor unit comprising a frame, ground wheel arrangements in the form of wheels or tracks for transporting the frame across the ground, a pair of forwardly extending front arms mounted on the frame for upward and downward pivotal movement, a mounting plate member pivotally carried on the front arms at a forward end thereof and an actuating cylinder for effecting pivotal movement of the mounting plate member, the cultivator attachment comprising: a generally planar main frame; a receptacle attached to the frame and generally upstanding therefrom shaped and arranged to receive and attach to the mounting plate member; a plurality of cultivator discs carried on the frame for working ground underneath the frame and forwardly of the skid steer tractor unit.

Preferably the cultivator discs includes two rows of disk each row extending across the frame generally transverse to a direction of forward movement of the skid steer tractor unit.

Preferably one of the rows of discs includes teeth projecting outwardly from at least some of the discs.

Preferably each row includes two disc sections with the disc sections each arranged such that an axis of rotation of the disc sections is inclined relative to a line at right angles to the forward direction and with the disc sections arranged so as to converge to an apex centrally of the frame and preferably there is provided means for adjusting the angle.

Preferably there is provided an actuating cylinder mounted on the frame for effecting simultaneous adjustment of the two rows of discs.

Preferably the cylinder is arranged so as to adjust the angles of the two rows of discs from a first position in which the apexes project inwardly toward the cylinder to a second position in which the apexes project outwardly away from the cylinder so as to reverse the direction of cut of the discs and allow movement of the frame in a reverse direction opposite to the forward direction.

Preferably there is provided a cylinder for effecting adjustment of the angle of the rows of discs, the cylinder including a pressure relief valve allowing the angle of the discs relative to the forward direction to decrease when pressure on the discs exceeds a predetermined pressure.

Preferably there is provided means for applying a weight to the frame at an end thereof opposite to the receptacle.

Preferably the receptacle is mounted at one end of the frame such that the frame projects forwardly from the mounting plate member.

Preferably there is provided a brace extending from an upper end of the receptacle to the frame.

Preferably the receptacle comprises a channel member for extending across an upper edge of the mounting plate member and receiving the upper edge therein and latch pin receiving means for receiving one or more latch pins of the mounting plate member adjacent the bottom edge of the mounting plate member.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
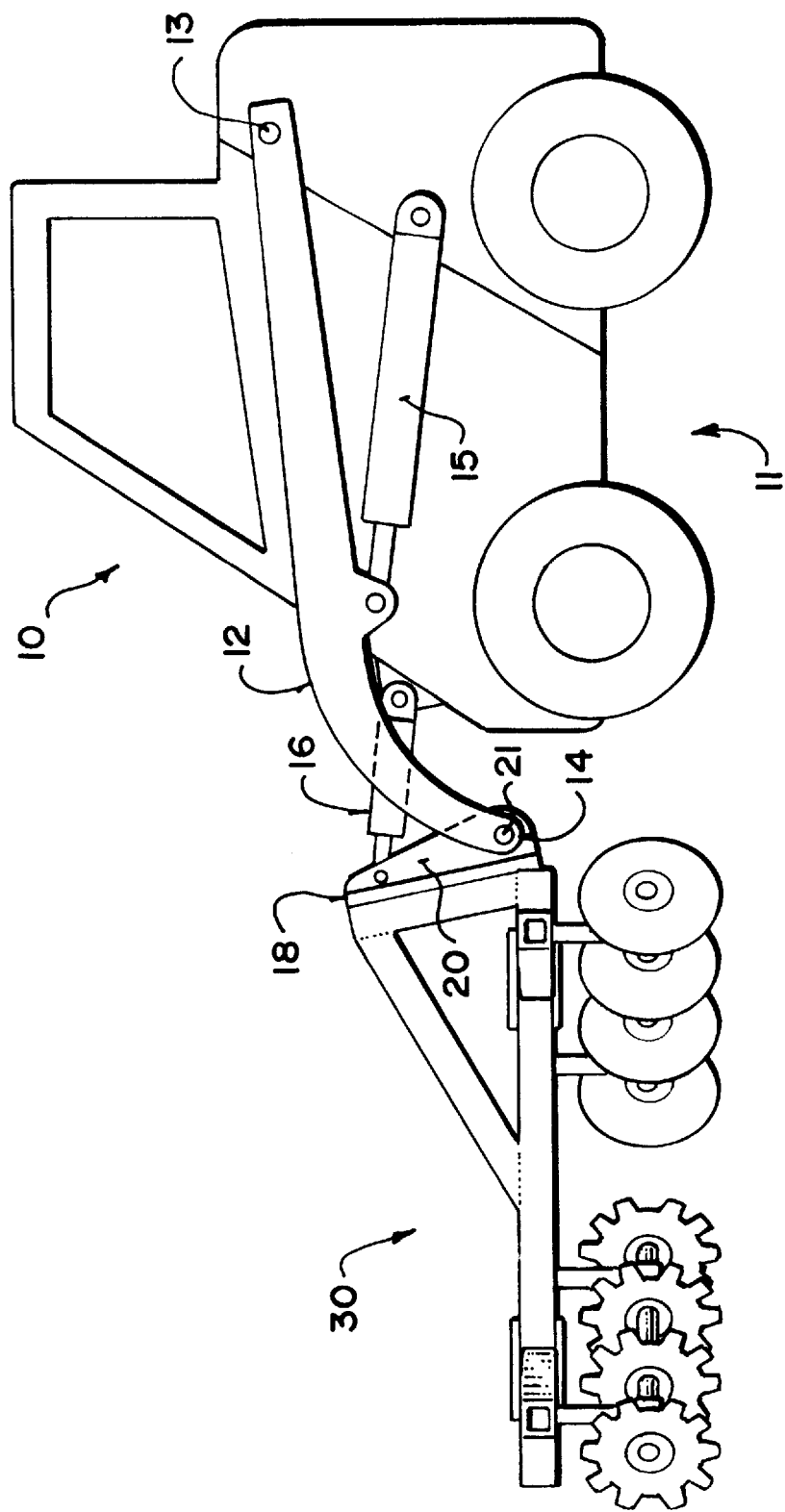
FIG. 1 is a side elevational view of the attachment according to the present invention mounted on a skid steer tractor unit.

The skid steer loader shown in FIG. 1 is of a conventional nature and comprises a frame generally indicated at 10 mounted on two ground wheel arrangements 11, only one of which is visible in FIG. 1 but it will be appreciated of course that second ground wheel arrangement is arranged on the opposed side of the frame. As shown the ground wheel arrangement is defined by a pair of ground wheels but in the alternative the ground wheel arrangement can comprise a track mounted on suitable drive elements. The frame carries a pair of forward extending arms 12 each of which is pivotally mounted about a pivot mounting pin 13 at the rear of the frame so that the arm extends forwardly and downwardly to a forward end 14 in front of the frame. The arms can be raised and lowered by cylinders 15. In between the two arms is mounted an actuating cylinder 16.

At the forward end of the arms is mounted a mounting plate member 17 which includes a transverse plate 18 extending across the front of the frame so as to bridge the space between the two arms 12. The plate includes a pair of rearwardly extending flanges 20 each of which carries a pivot pin 21 connected to the forward end 14 of the respective arm so as to allow pivotal movement of the plate 18 about the horizontal axis defined by the pins 21. A central device 22 receives a forward end 23 of the piston rod 24 of the cylinder 16 so as to effect the pivotal movement of the mounting plate member. The mounting plate member carries a pair of latch members 25.

The mounting plate member is conventional and readily available and is designed for attachment to an accessory which defines a cooperating receptacle 26 for the mounting plate member. The receptacle 26 includes an upper channel member 27 into which an upper end of the mounting plate member 18 is received. The receptacle also includes a pair of foot plates 28 and 29 each of which receives a respective side of a lower end of the plate 18 resting thereupon. The latch 25 at each side of the mounting plate actuates a latching pin 30 which extends vertically and projects when actuated vertically downwardly from the bottom surface of the mounting plate so as to extend into an opening 31 in the respective foot plate 28, 29.

The present invention provides a cultivator attachment generally indicated at 30 for mounting on the receptacle 26. The attachment 30 comprises a main frame 31 defined by three parallel frame members 32, 33 and 34 each extending along a direction 35 of forward movement of the tractor unit. The beams 32, 33 and 34 are interconnected by transverse beams 36 and 37. All of the beams are formed from square tube and lie in a common plane. The beams 32 and 34 have slotted portions 37 which are formed by welding top and bottom plates onto the square tubes and by omitting a portion of the square tubes between the top and bottom plates thus defining a slot a little bit longer than the width of one of the beams and having a height equal to the height of the beams.

The central beam 33 carries a pair of sliding collars 40 and 41. The collars can thus slide longitudinally along the beam 33 from an innermost position shown in full line in FIG. 2 to an outermost position indicated in dotted line at 40A and 41A in FIG. 2.

Each collar carries a pair of flanges 42 on each side with one flange at the top and one flange at the bottom and extending horizontally. Between the flanges is mounted a pivot beam 45, 46, 47 and 48. Thus each collar carries two of the pivot beams. Each pivot beams extends from the respective pair of flanges 42 through the respective slot 37 and thus is held in the same plane as the frame and is held basically fixed by the position of the collar while some slight forward and rearward movement is allowed by the width of the slot 37 which is slightly greater than the width of the beam.

The beams 45 and 47 thus form a pair each on a respective side of the collar. The beams are inclined as shown to the direction 35 and to a direction 35A at right angles to the forward direction 35. The beams thus form an apex at the collar with the beams extending away from the apex in opposed directions at a common angle to the direction 35. In the dotted line position 40A the beams also form an apex at the collar but the triangle defined by the apex is reversed.

Each beam carries a pair of vertical support legs 47 and 48 attached to an underside of the beam and extending vertically downwardly therefrom. At a lower end of the legs is mounted a horizontal shaft 49 which is free to rotate about its own horizontal axis on bearings 50 carried at the lower end of the legs 47 and 48. Each shaft 49 carries a plurality of cutting discs 51, 52. The discs are of a conventional nature and are dished so as to provide a conventional disc cutting action on the ground as the disc passes over the ground. The discs on the beams 44 and 47 are formed with teeth as indicated at 51A while the discs 52 are of a type having smooth edges.

Figure 2:
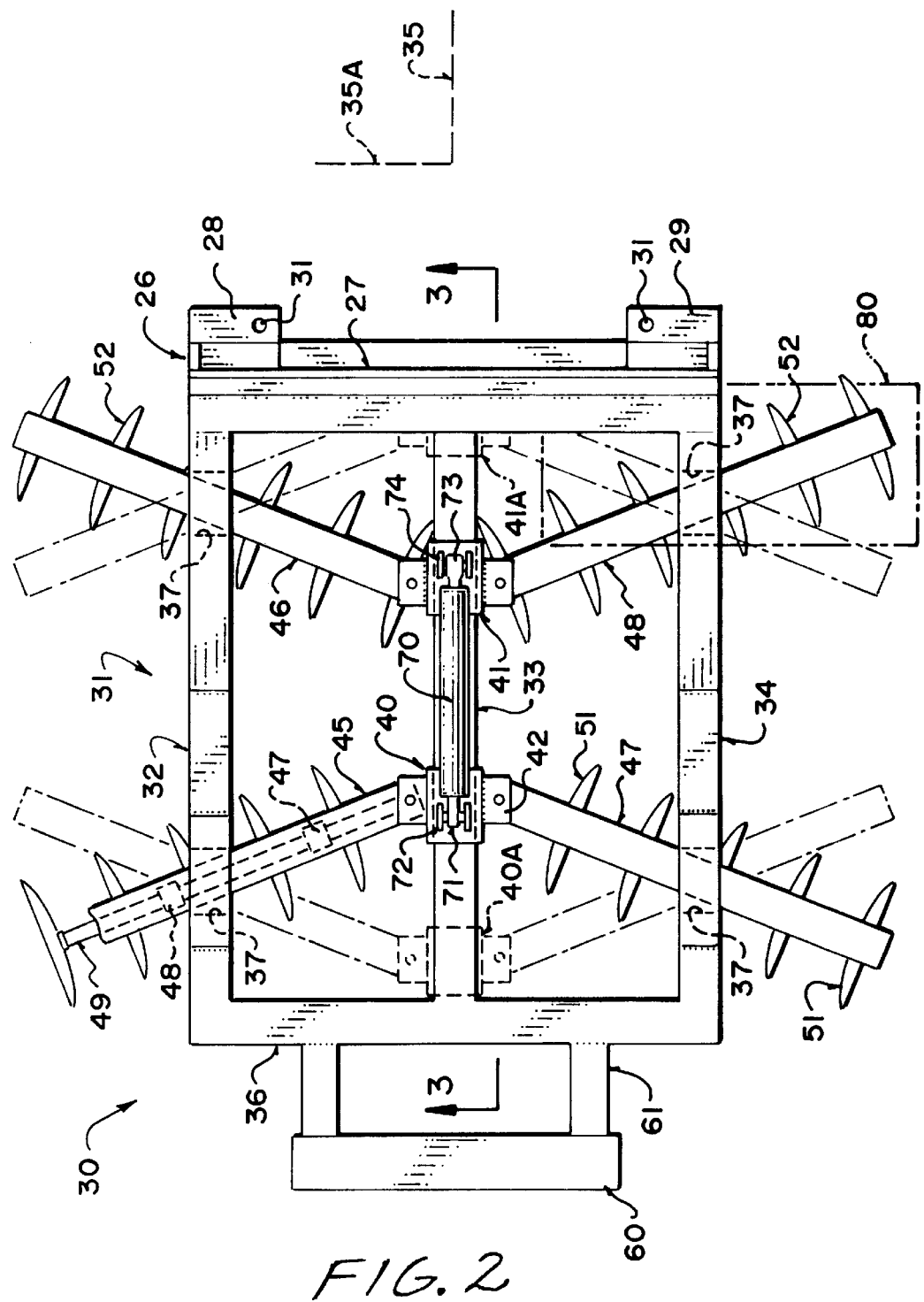
FIG. 2 is a top plan view of the attachment alone.
Figure 3:
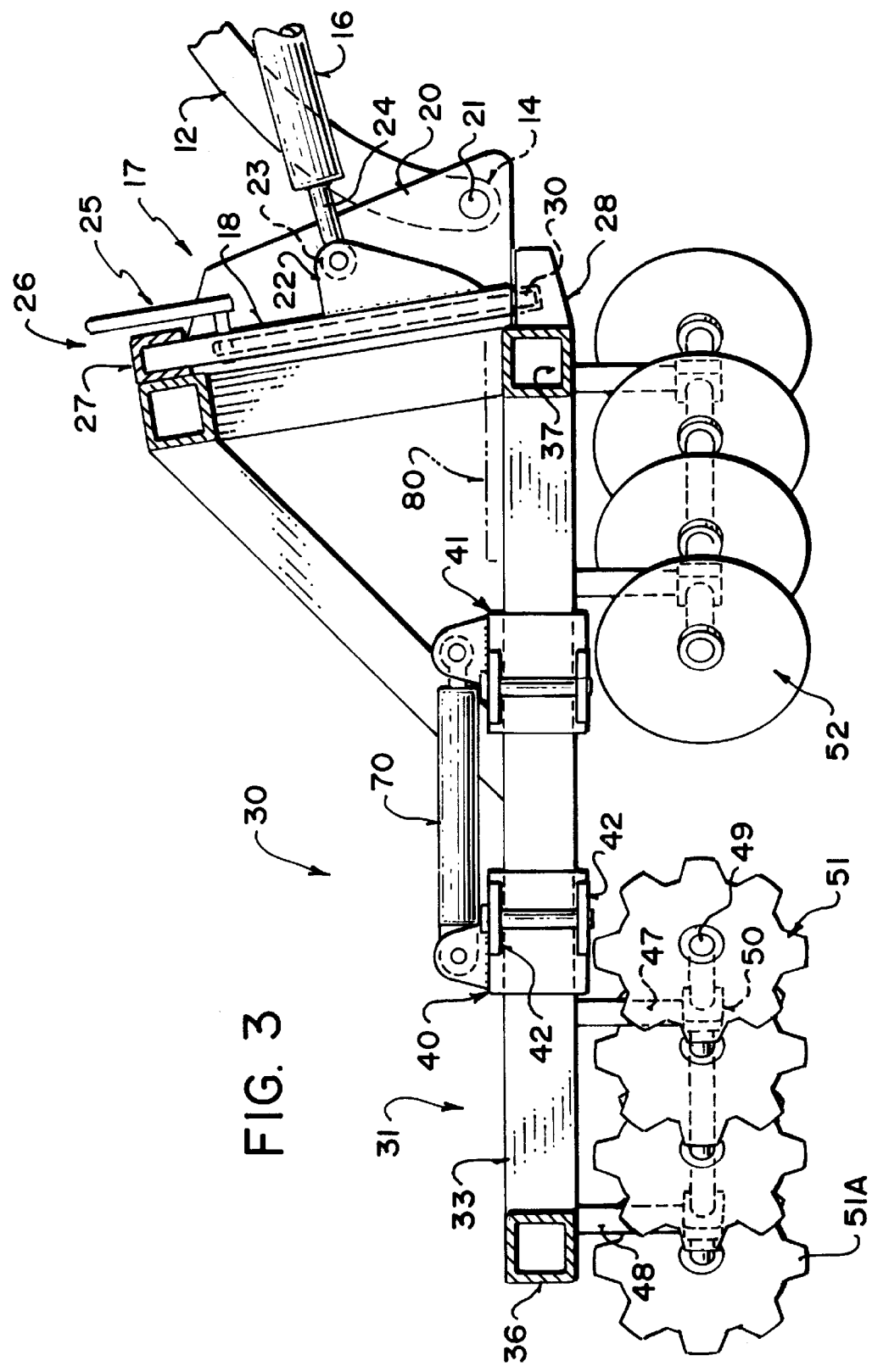
FIG. 3 is a cross sectional view along the lines 3—3 of FIG. 2 showing the mounting of the attachment onto a forward portion of the skid steer tractor unit.

The discs are oriented as shown in FIG. 2. Thus the discs 52 are dished outwardly of the respective beam so that the concave side faces toward the respective collar. The discs 51 are dished inwardly along the length of the beam so that the concave side faces outwardly away from the respective collar. The discs thus have a cutting action on the beam 46 which is opposite to the cutting action on the beam 48. Similarly the cutting action on the beam 47 is opposite to the cutting action on the beam 45.

This arrangement of the discs allows the discs to operate in a cutting action when the tractor unit is moved forwardly along the direction 35 and when the discs are in the position shown in full line in FIG. 2.

In this action the front discs having the teeth provide a cutting action on the soil whereas the smooth discs effect a turning action on the soil. After passage of the full set discs over the soil in a forward movement of the tractor, the cultivation action is complete.

In order to apply additional weight to the disc frame, a weight 60 can be attached onto arms 61 extending forwardly from the cross beam 36.

The collars 40 and 41 are interconnected by a cylinder 70 having a rear end 71 attached to a device 72 on the collar 40 and a forward end of the piston rod 73 attached to a device 74 on the collar 41. In the position shown in FIG. 2 in full line the cylinder is at a minimum extension pulling the apexes together and thus maximizing the angle of attack of the discs. Extension of the cylinder 70 moves the apexes to the dotted line position 40A, 41A thus reversing the action of the discs. In this position the tractor unit can be moved in the reverse direction so as to provide a disking action as the vehicle is moved rearwardly. This arrangement is particularly useful when the cultivation effect is required to remove all tracks from the vehicle itself so that the first cultivation action can be effected moving forwardly and then the action of the discs can be reversed by actuating the cylinder 70 following which the vehicle can be moved rearwardly.

The cultivator attachment of the present invention has a very simple construction with no power requirements and hence can be manufactured relatively inexpensively and has a reduced tendency to mechanical failure.

A rectangular plate 80 forms a step on the frame for an operator to step on the frame to enter the open front of the tractor. The step is located at one side of the frame and adjacent the mounting bracket.

A vertical guide knife can be provided on a cross-beam at a front of the frame which lies in the forward direction to act as a guide in the required direction and to limit sideways slip which can occur due to the sideways effect of the disks.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A combination of a skid steer tractor unit and a cultivator attachment therefor comprising:

a frame;

ground drive arrangement for transporting the frame across the ground in a forward and rearward direction;

a pair of forwardly extending front arms mounted on the frame forwardly of the frame for upward and downward pivotal movement;

a mounting plate member pivotally carried on the front arms at a forward end thereof;

an actuating cylinder for effecting pivotal movement of the mounting plate member;

and the cultivator attachment comprising:
- a generally planar main frame;
- a receptacle attached to the frame and generally upstanding relative thereto shaped and arranged to receive and attach to the mounting plate member;
- the receptacle and the mounting plate being arranged such that the front arms hold the main frame of the cultivator attachment fixed relative to the front arms for movement therewith;
- a first row of dished cultivator discs carried on the frame for working ground underneath the frame with the row generally transverse to the forward direction and forwardly of the arms;
- a second row of dished cultivator discs carried on the frame for working ground underneath the frame with the row generally transverse to the forward direction and forwardly of first row;
- each row including a central pivot coupling and two mounting beams connected at the central pivot coupling and arranged such that each beam extends outwardly to a respective side of the central coupling generally in the plane of the main frame, the central coupling and the beams being carried on the main frame such that the beams form a triangle meeting at an angle at an apex at the central pivot coupling and such that the central coupling can be moved forwardly and rearwardly so as to change the angle defined by the beams at the apex;
- each beam carrying a plurality of the dished cultivator disks such that the disks lie substantially at right angles to the beam;
- the central pivot coupling of each row being movable by a sufficient distance such that at a first extent of movement the apex of the triangle defined by the beams is rearward of the beams with the beams extending forwardly and outwardly therefrom and such that at a second opposed extent of movement the apex of the triangle defined by the beams is forward of the beams with the beams extending rearwardly and outwardly therefrom;
- and an actuating cylinder for simultaneously moving the central pivot coupling of the first row and the central pivot coupling of the second row between said first and second extents.

2. The combination according to claim 1 wherein the actuating cylinder is arranged to move the central pivot coupling of the first row and the central pivot coupling of the second row simultaneously in opposite directions between said first and second extents such that the first row is at the first extent when the second row is at the second extent and vice versa.

3. A combination of a skid steer tractor unit and a cultivator attachment therefor comprising:
- a frame;
- ground drive arrangement for transporting the frame across the ground in a forward and rearward direction;
- an actuating cylinder for effecting pivotal movement of a mounting plate member;
- and the cultivator attachment comprising:
  - a generally planar main frame;
  - a receptacle attached to the frame and generally upstanding relative thereto shaped and arranged to receive and attach to the mounting plate member;
  - the receptacle and the mounting plate being arranged such that the front arms hold the main frame of the cultivator attachment fixed relative to the front arms for movement therewith;
  - a first row of dished cultivator discs carried on the frame for working ground underneath the frame with the row generally transverse to the forward direction and forwardly of the arms;
  - a second row of dished cultivator discs carried on the frame for working ground underneath the frame with the row generally transverse to the forward direction and forwardly of first row;
  - each row including a central pivot coupling and two mounting beams connected at the central pivot coupling and arranged such that each beam extends outwardly to a respective side of the central coupling generally in the plane of the main frame, the central coupling and the beams being carried on the main frame such that the beams form a triangle meeting at an angle at an apex at the central pivot coupling and such that the central coupling can be moved forwardly and rearwardly so as to change the angle defined by the beams at the apex;
  - each beam carrying a plurality of the dished cultivator disks such that the disks lie substantially at right angles to the beam;
  - the central pivot coupling of each row being movable by a sufficient distance such that at a first extent of movement the apex of the triangle defined by the beams is rearward of the beams with the beams extending forwardly and outwardly therefrom and such that at a second opposed extent of movement the apex of the triangle defined by the beams is forward of the beams with the beams extending rearwardly and outwardly therefrom;
  - the dished cultivator disks of one beam being arranged on the beam such that they are dished in a direction to face along the beam in one direction and the dished cultivator disks of the other beam being arranged on the other beam such that they are dished in a direction to face along the beam in a direction opposed to said one direction;
  - the dished cultivator disks of one beam of the first row extending to one side of the central pivot coupling of the first row are arranged on the beam such that they are dished in a direction to face along the beam in a first direction and the dished cultivator disks of one beam of the second row extending to the same side of the central pivot coupling of the second row are arranged on the beam of the second row such that they are dished in a direction to face along the beam in a second direction opposed to said first direction;
  - and an actuating cylinder for simultaneously moving the central pivot coupling of the first row and the central pivot coupling of the second row between said first and second extents in opposed directions such that the first row is at the first extent when the second row is at the second extent and vice versa.

* * * * *